United States Patent [19]

Tsubuko et al.

[11] Patent Number: 5,026,621

[45] Date of Patent: Jun. 25, 1991

[54] TONER FOR ELECTROPHOTOGRAPHY

[75] Inventors: Kazuo Tsubuko; Shinichi Kuramoto, both of Numazu; Kazuhiko Umemura, Susono; Makoto Ohkawara, Tokyo, all of Japan

[73] Assignee: Ricoh Company, Ltd., Tokyo, Japan

[21] Appl. No.: 351,025

[22] Filed: May 12, 1989

[30] Foreign Application Priority Data

May 17, 1988 [JP] Japan ................................ 63-119481

[51] Int. Cl.$^5$ ........................ G03G 9/00; C08F 259/00

[52] U.S. Cl. .................................... 430/109; 430/114; 525/276

[58] Field of Search ................ 430/109, 114; 525/534, 525/276

[56] References Cited

FOREIGN PATENT DOCUMENTS

| | | | |
|---|---|---|---|
| 1190511 | 8/1986 | Japan . | |
| 2081044 | 4/1987 | Japan | 430/109 |
| 3053561 | 3/1988 | Japan | 430/109 |
| 3182663 | 7/1988 | Japan | 430/109 |
| 2273576 | 11/1988 | Japan | 430/109 |

*Primary Examiner*—Marion E. McCamish
*Assistant Examiner*—S. Crossan
*Attorney, Agent, or Firm*—Cooper & Dunham

[57] ABSTRACT

A toner for electrophotography is disclosed, which comprises as the main components a coloring component and a binder resin which is a block copolymer comprising a functional segment (A) consisting of at least one of a fluoralkyl acryl ester block unit or a fluoralkyl methacryl ester block unit, and a compatible segment (B) consisting of a fluorine-free vinyl or olefin monomer block unit.

12 Claims, No Drawings

TONER FOR ELECTROPHOTOGRAPHY

BACKGROUND OF THE INVENTION

The present invention relates to an improved toner for electrophotography, which is suitable for high speed development of latent electrostatic images and fixing the developed images, comprising a particular resin having excellent anti-offset and anti-blocking properties.

Recently electrophotography is applied not only to copying machines, but also to laser printers. In accordance with this trend of the application of electrophotography, there is a keen demand for high speed recording by electrophotography. Thus, heat rollers suitable for high speed image fixing are widely used as image fixing unit for electrophotogaphy. Furthermore, since developed or printed images on copy sheets are apt to be bent when used in practice, for instance, in direct mail, and post cards, improved image fixing performance is required for printing by electrophotography.

In Japanese Laid-Open Patent Application 50-134652, there is proposed a toner for electrophotography comprising as a binder agent therefor a styrene - acryl copolymer resin having a degree of dispersion (Mw/Mn) of 3.5 to 40 as being excellent in anti-offset property, where Mw represents the weight average molecular weight of the copolymer and Mn represents the number average molecular weight of the copolymer.

Furthermore, in Japanese Laid-Open Patent Application 62-115170, there is proposed a toner for electrophotography as being suitable for high speed image fixing, and as the anti-offset and anti-blocking properties being improved, which comprises a styrene - acryl copolymer resin (A) having a weight average molecular weight of 10,000 to 30,000 and a glass transition temperature of 60° C. to 70° C., and a styrene - acryl copolymer (B) having a weight average molecular weight of 200,000 to 400,000 and a glass transition temperature of 55° C. to 65° C., with a mixing ratio by weight of the copolymer (A)/copolymer (B) being in the range of 90/10 to 50/50, and has a melt viscosity of 10,000 poise or less at 140° C.

However, the above conventional toners have the drawbacks that in the case where the toners are used as liquid developers, they cannot be dispersed in a stable manner in aliphatic hydrocarbon solvents, and in the case where the toners are used as dry toners, the image fixing performance is insufficient for use in practice when applied image fixing energy is low.

SUMMARY OF THE INVENTION

It is therefore an object of the present invention to provide an improved toner for electrophotography from which the above discussed drawbacks of the conventional toners have been eliminated, and which is suitable for high speed development of latent electrostatic images and fixing the developed images, comprising a particular resin having anti-offset and anti-blocking properties.

This object of the present invention can be achieved by a toner comprising as the main components a coloring component and a binder resin which is a block copolymer comprising a functional segment (A) consisting of at least one of a fluoroalkyl acryl ester block unit or a fluoroalkyl methacryl ester block unit, and a compatible segment (B) consisting of a fluorine-free vinyl or olefin monomer block unit.

DETAILED DESCRIPTION OF THE PREFERRED EMBODIMENTS

In the toner according to the present invention, the functional segment of the block copolymer is oriented to the surface of the block polymer and the compatible segment thereof is oriented so as to be compatible with other resins and a coloring agent contained in the toner, so that the toner is provided with well-balanced liquid-repelling and solvent-soluble properties. In the block copolymer, generally the weight ratio of the segment (A) to the segment (B) be in the range of (0.01 to 80): (20 to 99.99), preferably in the range of (5 to 30): (70 to 95).

Examples of the monomers by which the compatibe segment (B) of the block copolymer can be prepared include alkyl esters of acrylic acid and methacrylic acid; vinyl monomers such as styrene, vinyl toluene, and vinyl acetate; and olefin monomers such as ethylene, propylene, and butene.

The block copolymer for use in the present invention is much more suitable for use in the toner than commercially available alternative and random copolymerized fluorine-containing polymers in terms of the above-mentioned liquid-repelling and solvent-soluble properties. Therefore, when the block copolymer is used in a toner for thermal image fixing by using heat rollers, the occurrence of the offset phenomenon can be minimized. Furthermore, due to the above-mentioned properties, resins having low softening point can be employed in combination with the block copolymer, so that toners suitable for high speed image fixing and having excellent anti-blocking propery can be prepared when the block copolymer for use in the present invention is employed.

The block copolymer for use in the present invention can be advantageously employed in both liquid type toner and dry type toner for electrophotography.

A dry type toner according to the present invention can be prepared by combining a coloring agent, the block copolymer which serves as a binder resin, and when necessary with addition of finely-divided magnetic particles thereto.

Examples of the coloring agent for use in the present invention include carbon black, nigrosine dye, Aniline Blue, Calconyl Blue, Chrome Yellow, Ultramarine Blue, Du Pont Oil Red, Monoline Yellow, Marachite Green Oxalate, Lamp Black, and Rose Bengale and mixtures of the above.

It is preferable that the amount of the coloring agent be in the range of 3 wt. % to 50 wt. % of the entire weight of the toner of the present invention.

Examples of finely-divided magnetic particles include ferrite particles and magnetite particles.

It is preferably that the amount of the finely-divided magnetic particles be in the range of 3.0 wt. % to 60 wt. % of the entire weight of the toner.

When both magnetic particles and coloring agent are used in combination, it is preferably that the amount of the coloring agent be 10 wt. % or less of the entire weight of the toner.

More specifically, a dry type toner according to the present invention can be prepared by kneading the above-mentioned components by a conventional method. Of the above mentioned components, it is preferable that the binder resin be fused with application of heat thereto and mechanincally mixed with other components.

For this purpose, for instance, a method of causing a mixture of the necessary components to pass between a pair of heated rollers, a method of mixing the mixture by a heated screw, a method of injecting the mixture in a melted state from nozzles with application of pressure and other methods equivalent to the above can be employed.

In the above methods, the fused or melted mixture of the toner components is cooled to form a lump and the cooled lump is then pulverized by a conventional method to particles having a particle size of about 5 $\mu m$ to about 30 $\mu m$. For pulverizing the lump, conventional mechanical pulverizing methods such as the methods of using a hammer mill or a jet mill can be employed. When necessary, the pulverized toner particles are appropriately classified by a conventional method.

When a liquid type toner according to the present invention is prepared, it is preferable that the surface of the coloring agent be treated with the block copolymer. As a matter of course, the block copolymer can be used as binder resin.

As the coloring agents for the liquid type toner, the same coloring agents as those employed in the dry type toner can be employed. As a carrier liquid for the liquid type toner, aliphatic hydrocarbons can be employed. Commercially available carrier liquids for use in the liquid type toner are, for example, Isopar H, Isopar G and Isopar L made by Exxon Chemical Co., Ltd.

A liquid type toner can be prepared, for example, by dispersing a coloring agent, the block copolymer serving as binder resin, and Isopar G in a dispersing apparatus, for 24 to 30 hours. It is preferable that the particle size of the toner be in the range of 1 to 2 $\mu m$.

To the toner according to the present invention, there can be added other conventional additives, for example, resins such as rosin resins, low-molecular-weight polyethylene, low-molecular-weight polypropylene, ethylene copolymer, ethylene graft copolymer, styrene resin, styrene-acryl copolymer, acrylic resin, long-chain fatty acids and esters thereof; waxes such as paraffin wax, Castorwax (Trademark for hydrogenated castor oil, the triglyceride of 12-hydroxystearic acid), and Carnauba wax; and iononer resin, in order to improve the image fixing performance and offset prevention effect of the toner.

Specific examples of the fluoroalkyl acryl ester and fluoroalkyl methacryl ester for constructing the functional segment (A) of the block copolymer for use in the present invention are shown in the following Table 1:

TABLE 1

Characteristics of Fluoroalkyl Acryl Esters and Fluoroalkyl Methacryl Esters

| Fluoroalkyl | Boiling Point (°C.) | (Torr) | Refractive Index | Specific Gravity (d) |
|---|---|---|---|---|
| Acrylate | | | | |
| $-CH_2CF_3$ | 45.9 | (125) | 1.3480* | 1.216* |
| $-CH_2C_2F_5$ | 50.2 | (100) | 1.3365 | 1.32 |
| $-CH_2C_3F_7$ | 51.3 | (50) | 1.3317 | 1.409 |
| $-CH_2C_4F_9$ | 57.5 | (30) | 1.3289* | 1.48* |
| $-CH_2C_5F_{11}$ | 63.5 | (20) | 1.3296 | 1.54 |
| $-CH_2C_7F_{11}$ | 55.2 | (2.5) | 1.3829 | 1.63 |
| $-CH_2C_8F_{17}$ | 65 | (5) | 1.3279 | 1.631 |
| $-CH_2C_9F_{19}$ | 53 | (0.0344) | 1.3279 | 1.689 |
| $-CH_2C_{10}F_{21}$ | 220 | (740) | 1.3279 | 1.689 |
| Meta Acrylate | | | | |
| $-CH_2CF_3$ | 115 | | 1.437 | |
| $-CH_2(CF_2CF_2)_2H$ | 83 | 85 (24) | 1.3553 | 1.3553 |
| $-CH_2CH_2C_3F_7$ | 70 | 73 (10) | 1.3635 | |
| $-(CH_2)_2C_8F_{17}$ | 102 | 104 (0.1) | | |
| $-CH_2(CF_2CF_2)_3H$ | 75 | (5) | 1.3375 | 1.5574 |
| $-CH_2(CF_2CF_2)_4H$ | 91 | (4) | 1.3345 | |

*at 25° C.

An example of a process for preparation of the block copolymer for use in the present invention, which uses a fluoroalkyl acryl or methacryl ester is as follows:

[Synthesis of Polymerization Initiator]

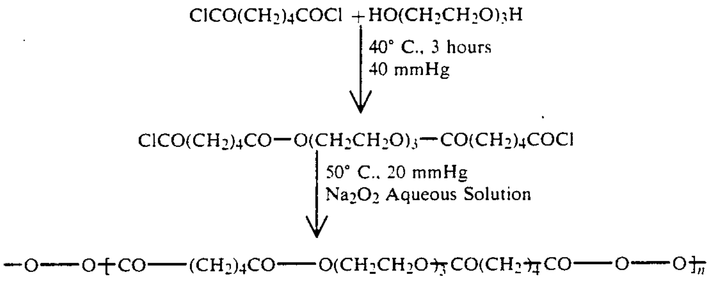

[I]

M.W. = 2140 (n = 5.3)
Active Oxygen = 4.20% (measured by KI)
The amount of the active oxygen decreases to half at 63° C. in 10 hours.

[Synthesis of Polystyrene Peroxide]

The above polymerization initiator [I] (1.2 g) + Styrene (15 g)

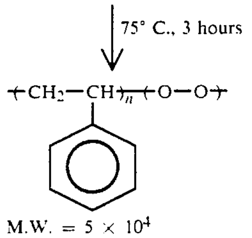

M.W. = 5 × $10^4$
Active Oxygen = 3.0%

The molecular weight of the above compound was decreased to $4.5 \times 10^{-3}$, and the C=O and —O—O— disappear in the presence of alkali at 62° C. in 2 hours.

[Synthesis of Block Copolymer]

-continued $n = 100 \sim 500$, $m = 20 \sim 100$.

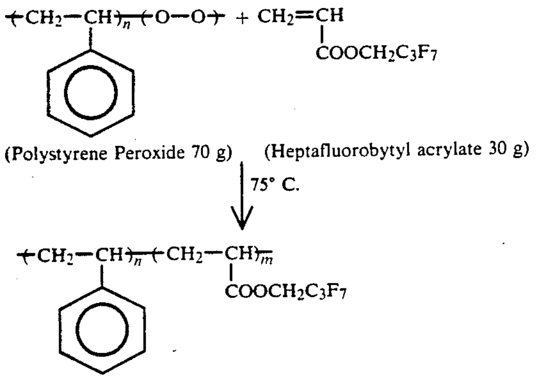

Specific examples of the thus prepared block copolymer are as follows:

Block Copolymer

No. 1

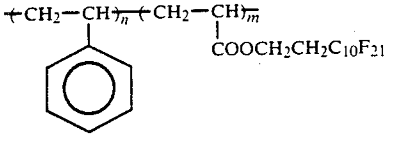

No. 2

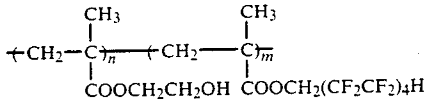

No. 3

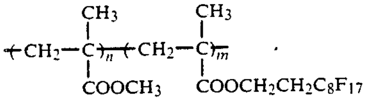

No. 4

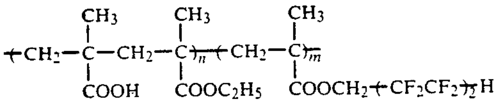

No. 5

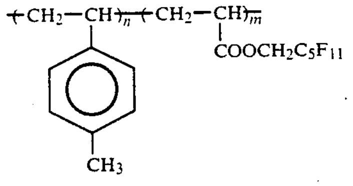

No. 6

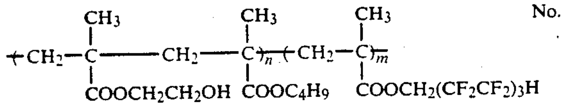

No. 7

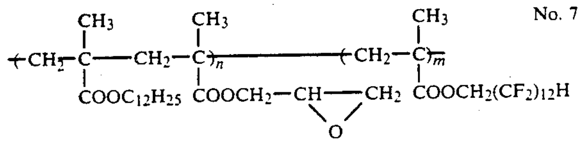

No. 8

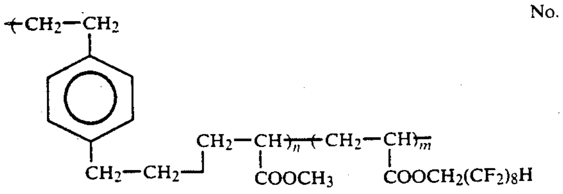

The present invention will now be explained in detail by referring to the following examples. These examples are given for illustration of the invention and are not intended to be limiting thereof.

EXAMPLE 1

A mixture of the following components was mixed in a dry state, kneaded and fused in a kneader with application of heat:

| | Parts by Weight |
|---|---|
| Block copolymer No. 2 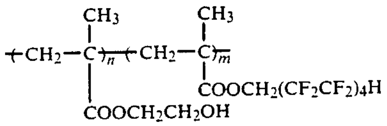 | 80 |
| Charge controlling agent (Trademark "Oil Black BY" made by Orient Chemical Co., Ltd.) | 2 |
| Carbon black (Trademark "Mitsubishi Carbon #44" made by Mitsubishi Chemical Industries, Ltd.) | 15 |
| Polypropylene (Trademark "Viscol 550P" made by Sanyo Chemical Industries, Ltd.) | 3 |

The kneaded mixture was cooled to room temperature, crushed, pulverized by a jet mill and classified to obtain finely-divided particles having a particle size ranging from 5 μm to 25 μm, whereby a toner was prepared.

The thus prepared toner was mixed with a finely-divided iron oxide carrier (Trademark "EFV 200/300" made by Nihon Teppun Co., Ltd.) with a concentration of the toner being 5 wt. %, whereby a dry toner No. 1 according to the present invention was prepared.

By use of this toner in a commercially available copying machine (Trademark "SF-750" made by Sharp Corporation), a toner image was formed on a copy sheet. The thus formed toner image was fixed to the copy sheet by an oil-less teflon roller under the conditions that the line pressure of the roller was 0.5 kg/cm, the nip width was 4 mm and the sheet transportation speed was 80 mm/sec, with the temperature of the heat roller changed, to evaluate the image fixing performance and the anti-offset property of the toner No. 1 of the present invention. The results are shown in Table 2.

COMPARATIVE EXAMPLE 1

Example 1 was repeated except that the block copolymer No. 2 employed in Example 1 was replaced by a random copolymer of the same components as in the block copolymer No. 2, whereby a comparative toner No. 1 was prepared. The comparative dry toner No. 1 was subjected to the same evaluation test as in Example 1. The results of the evaluation are shown in Table 2.

EXAMPLE 2

Example 1 was repeated except that the block copolymer No. 2 employed in Example 1 was replaced by 50 parts by weight of a block copolymer No. 4 having the following formula and 30 parts by weight of styrene

- acryl copolymer, whereby a dry toner No. 2 according to the present invention was prepared.

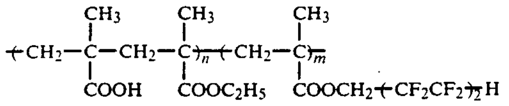

The toner No. 2 was subjected to the same evaluation test as in Example 1. The results of the evaluation are shown in Table 2.

COMPARATIVE EXAMPLE 2

Example 2 was repeated except that the block copolymer No. 4 employed in Example 2 was replaced by a random copolymer of the same components as in the block copolymer No. 4, whereby a comparative dry toner No. 2 was prepared. The comparative toner No. 2 was subjected to the same evaluation as in Example 1. The results of the evaluation are shown in Table 2.

EXAMPLE 3

Example 1 was repeated except that the block copolymer No. 2 employed in Example 1 was replaced by 30 parts by weight of a block copolymer No. 5 having the following formula and 50 parts by weight of rosin-modified maleic acid resin, whereby a dry toner No. 3 according to the present invention was prepared.

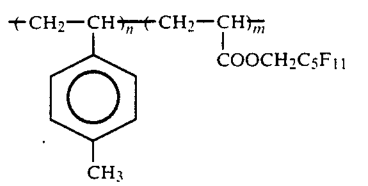

The toner No. 3 was subjected to the same evaluation as in Example 1. The results of the evaluation are shown in Table 2.

COMPARATIVE EXAMPLE 3

Example 3 was repeated except that the block copolymer No. 5 employed in Example 3 was replaced by a random copolymer of the same components as in the block copolymer No. 5, whereby a comparative dry toner No. 3 was prepared. The comparative toner No. 3 was subjected to the same evaluation test as in Example 1. The results of the evaluation are shown in Table 2.

EXAMPLE 4

A mixture of the following components was dispersed in an attritor for 10 hours, whereby a liquid toner with toner particles having a particle size of 1.3 μm, which is referred to as liquid toner No. 4 according to the present invention was prepared:

| | Parts by Weight |
|---|---|
| Mitsubishi Carbon #44 | 100 |
| Block copolymer No. 7 | 50 |
| 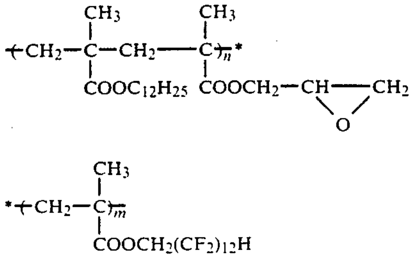 | |
| Isopar H | 500 |

By use of this toner, a toner image was formed on a copy sheet and then fixed thereto by an image fixing roller heated to a surface temperature of 100° C. to 130° C. The result was that the fixed toner image was excellent in quality and no offset phenomenon was observed.

COMPARATIVE EXAMPLE 4

Example 4 was repeated except that the block copolymer No. 7 employed in Example 4 was replaced by a random copolymer of the same components as in the block copolymer No. 7, whereby a comparative dry toner No. 4 was prepared. The comparative toner No. 4 was subjected to the same image fixing test as in Example 4. The result was that offset phenomenon was observed.

EXAMPLE 5

[Preparation of Coloring Agent (A)]

A mixture of 400 g of carbon black (Trademark "Carbon Black MA-11" made by Mitsubishi Carbon Co., Ltd.) and 600 g of an ethylene/maleic anhydride (98/2) graft copolymer was mixed and kneaded at 120° C. for 2 hours in a kneader. To this mixture, 100 g of an acryl ester/fluoromethacrylate block copolymer (Trademark "Modiper F200" made by Nippon Oils & Fats Co.,

TABLE 2

| | Example 1 | Comparative Example 1 | Example 2 | Comparative Example 2 | Example 3 | Comparative Example 3 |
|---|---|---|---|---|---|---|
| Resin Component(s) | Block Copolymer No. 2 80 parts | Random Copolymer 80 parts | Block Copolymer No. 4 50 parts Stylene acryl Copolymer 30 parts | Random Copolymer 50 parts Stylene Acryl Copolymer 30 parts | Block Copolymer No. 5 30 parts Rosin-Modified Maleic Acid Resin 50 parts | Random Copolymer 30 parts Rosin-Modified Maleic Acid Resin 50 parts |
| Anti-blocking* Property | O | Δ | O | X | O | X |
| Anti-offset** Property | 200° C. | 183° C. | 190° C. | 165° C. | 180° C. | 150° C. |

*Anti-blocking property was evaluated by subjections each toner, which was reserved at 50° C. for 7 days, to a penetration test in accordance with Japanese Industrial Standard (JIS) 2207. "X" was denotes 0 ~ 1 mm; Δ, 2 ~ 10 mm; and "O", 11 mm or more.

**The temperature in anti-offset property indicates a minimum temperature at which offset phenomenon began to take place.

Ltd.) was added, and the mixture was kneaded at 120° C. for another one hour. The kneaded mixture was cooled to room temperature and pulverized to particles having a particle size of 2 mm or less, whereby a coloring agent (A) was prepared.

[Preparation of Liquid Toner No. 5]

A mixture of the following components was dispersed in an attritor at 40° C. for 40 hours, whereby a liquid toner No. 5 according to the present invention was prepared.

| | |
|---|---|
| Coloring agent (A) | 100 g |
| Laurylmethacrylate/glycidyl methacrylate (90/10) by weight ratio | 50 g |
| Isopar L | 500 g |

By use of this toner, a toner image was formed on a copy sheet and then fixed thereto by an image fixing roller which was heated to 125° C. to 145° C. at the surface thereof. The result was that the fixed toner image was excellent in quality and no offset phenomenon was observed.

A comparative toner was prepared by repeating the above described procedure except that Modiper F200 was eliminated from the formulation of the coloring agent (A), and by use of this comparative toner, the same image fixing test as mentioned above was conducted. The result was that offset phenomenon was slightly observed.

EXAMPLE 6

[Preparation of Coloring Agent (B)]

A mixture of the following components was dispersed in a kneader at 25° C.:

| | |
|---|---|
| Carbon black (Trademark "Reagal #400" made by Cabot Corporation) | 400 g |
| Ammonium fumate | 10 g |
| Water | 500 g |

The above mixture was dispersed in the kneader for about 1 hour to form a mixture in the form of a water-containing carbon paste. To this mixture, the following components were added:

| | |
|---|---|
| Ethylene/ethylacrylate/maleic anhydride (60/35/5) copolymer | 700 g |
| Acryl ester/fluoromethacrylate block copolymer (Trademark "Modiper F100" made by Nippon Oils & Fats Co., Ltd.) | 50 g |

The above mixture was kneaded at 130° C. for 2 hours and flushed. After removing water from the mixture, the mixture was further kneaded at 120° C. for 2 hours, followed by removing volatile components from the mixture, whereby a coloring agent (B) was prepared.

[Preparation of Liquid Toner No. 6]

A mixture of the following components was dispersed in an attritor at 40° C. for 40 hours, whereby a liquid toner No. 6 according to the present invention was prepared.

| | |
|---|---|
| Coloring agent (B) | 100 g |
| Laurylmethacrylate/glycidyl | 50 g |

-continued

| | |
|---|---|
| methacrylate (90/10 by weight ratio) | |
| Isopar L | 500 g |

By use of this toner, a toner image was formed on a copy sheet and then fixed thereto by an image fixing roller which was heated to 125° C. to 145° C. The result was that the fixed toner image was excellent in quality and no offset phenomenon was observed.

A comparative toner was prepared by repeating the above described procedure except that Modiper F100 was eliminated from the formulation of the coloring agent (B), and by use of this comparative toner, the same image fixing test as mentioned above was conducted. The result was that offset phenomenon was slightly observed.

EXAMPLE 7

The coloring agent (B) prepared in Example 6 was pulverized and then classified by a zigzag classifier, whereby finely-divided coloring agent particles having a particle size ranging from 5 μm to 25 μm were obtained. These coloring agent particles were employed as a dry toner No. 7 according to the present invention.

The thus obtained dry toner No. 7 was evaluated in the same manner as in Example 1. The result was that the anti-offset property at 182° C. and the anti-blocking property were both excellent.

Thus, the toner according to the present invention can be employed in the electrophotographic process comprising the steps of:

(1) forming an latent electrophotographic image on a photoconductor;

(2) developing the latent electrophotographic image to a visible toner image by the toner and (3) fixing the visible toner image to a sheet by thermally fusing the toner image.

What is claimed is:

1. A toner for electrophotography comprising as the main components a coloring component and a binder resin which is a block copolymer comprising a functional segment (A) consisting of at least one of a fluoroalkyl acryl ester block unit or a fluoroalkyl methacryl ester block unit, and a compatible segment (B) consisting of a fluorine-free vinyl or olefin monomer block unit.

2. The toner as claimed in claim 1, wherein the weight ratio of said functional segment (A) to said compatible segment (B) is in the range of $(0.1\sim80):(20\sim99.99)$.

3. The toner as claimed in claim 2, wherein the weight ratio of said functional segment (A) to said compatible segment (B) is in the range of $(5\sim30):(70\sim95)$.

4. The toner as claimed in claim 1, wherein said fluorine-free vinyl monomer block unit for said compatible segment (B) is a block unit prepared by polymerizing a monomer selected from the group consisting of an acrylic acid alkyl ester, a methacrylic acid alkyl ester, styrene, vinyl toluene and vinyl acetate.

5. The toner as claimed in claim 1, wherein said fluorine-free olefin monomer block unit for said compatible segment (B) is a block unit prepared by polymerizing a monomer selected from the group consisting of ethylene, propylene and butene.

6. The toner as claimed in claim 1, wherein the amount of said coloring agent is in the range of 3 wt. % to 50 wt. % of the entire weight of said toner.

7. The toner as claimed in claim 1, further comprising a finely-divided magnetic component.

8. The toner as claimed in claim 7, wherein said finely-divided magnetic component is selected from the group consisting of finely-divided ferrite particles and finely-divided magnetite particles, in an amount of 3.0 to 60 wt. % of the entire weight of said toner.

9. The toner as claimed in claim 1, further comprising a carrier liquid to form a liquid toner, with the particle size of said toner being in the range of about 1 μm to about 2 μm.

10. The toner as claimed in claim 1, wherein said toner is a dry toner having a particle size ranging from about 5 μm to about 30 μm.

11. The toner as claimed in claim 1, wherein said block copolymer is selected from the group consisting of:

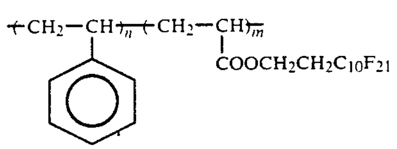
No. 1

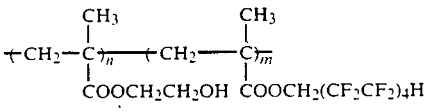
No. 2

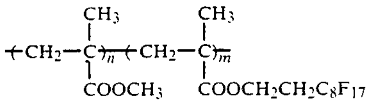
No. 3

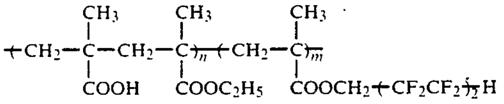
No. 4

-continued

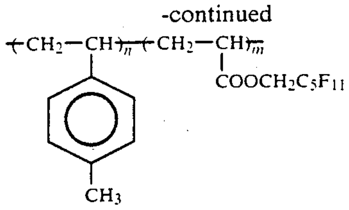
No. 5

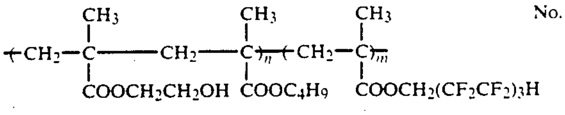
No. 6

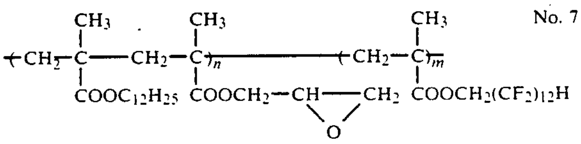
No. 7

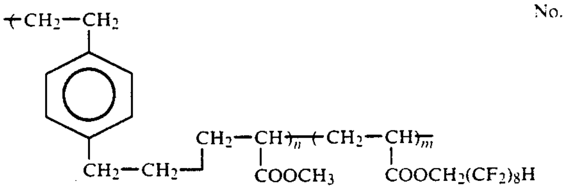
No. 8 where n is 100～500, and m is 20～100.

12. An electrophotographic method comprising the steps of:

(1) forming an latent electrophotographic image on a photoconductor;

(2) developing said latent electrophotographic image to a visible toner image by a toner for electrophotography comprising as the main components a coloring component and a binder resin which is a block copolymer comprising a functional segment (A) consisting of at least one of a luoroalkyl acryl ester block unit or a fluoroalkyl methacryl ester block unit, and a compatible segment (B) consisting of a fluorine-free vinyl or olefin monomer block unit; and (3) fixing said visible toner image to a sheet by thermally fusing said toner image.

* * * * *